(12) United States Patent
Andreas-Schott et al.

(10) Patent No.: US 7,799,479 B2
(45) Date of Patent: Sep. 21, 2010

(54) INTEGRATED PRESSURE RELIEF VALVE FOR FUEL CELL STACK

(75) Inventors: Benno Andreas-Schott, Pittsford, NY (US); Roger M. Brisbane, Spencerport, NY (US); Anthony G. Chinnici, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 965 days.

(21) Appl. No.: 11/549,786

(22) Filed: Oct. 16, 2006

(65) Prior Publication Data

US 2008/0090122 A1    Apr. 17, 2008

(51) Int. Cl.
*H01M 8/24* (2006.01)
(52) U.S. Cl. ..................................... 429/453
(58) Field of Classification Search .................. 429/25; 454/340; 251/174, 176, 227, 337
See application file for complete search history.

(56) References Cited

U.S. PATENT DOCUMENTS

| 3,519,487 | A | * | 7/1970 | Winsel et al. | ................. 429/17 |
| 5,246,030 | A | * | 9/1993 | Jerina | ........................ 137/478 |
| 5,316,871 | A | | 5/1994 | Swathirajan et al. | |
| 2004/0241063 | A1 | | 12/2004 | Appleby et al. | |

FOREIGN PATENT DOCUMENTS

JP      2004 183706 A1    7/2004

* cited by examiner

*Primary Examiner*—Patrick Ryan
*Assistant Examiner*—Thomas H. Parsons
(74) *Attorney, Agent, or Firm*—Fraser Clemens Martin & Miller LLC; J. Douglas Miller

(57) ABSTRACT

A pressure relief valve for a fuel cell stack assembly is disclosed, wherein the valve is disposed in an insulation end plate to militate against an over pressurization of the fuel cell stack assembly.

8 Claims, 3 Drawing Sheets

INTEGRATED PRESSURE RELIEF VALVE FOR FUEL CELL STACK

FIELD OF THE INVENTION

The present invention relates to fuel cell stacks and more particularly to fuel cell stacks having integrated pressure relief valves that vent excess pressure from the fuel cell during stacking, pressurization, and operation of the fuel cell stack.

BACKGROUND OF THE INVENTION

A hydrogen fuel cell is an electro-chemical device that includes an anode and a cathode with an electrolyte therebetween. The anode receives a fuel such as hydrogen gas and the cathode receives an oxidant such as oxygen or air. Several fuel cells are typically combined in a fuel cell stack to generate a desired amount of power. A typical fuel cell stack for a vehicle may include several hundred individual cells. Typically, the fluid is caused to flow through the stack by a compressor. Oxygen not consumed in the stack is expelled as a cathode exhaust gas that may include water as a stack by-product.

A fuel cell stack includes a wet end adapted to receive the fuel, oxidizer, and cooling fluids, and a dry having an insulation end plate unit. When producing a fuel cell stack, it may be necessary to pressurize the system to prepare the fuel cell stack for operation. The fuel cell stack is typically pressurized to test for leaks, and to ensure that the stack will function efficiently. Over pressurization of the fuel cell stack is undesirable.

It has been a continuing challenge to provide an efficient and cost effective fuel cell stack which militates against an over pressurization during production, testing, or operation. Space in and round the fuel cell stack is extremely limited and valued, especially in vehicular applications.

Prior art fuel cell stacks include unit cells and separators. Each fuel cell typically includes a solid polymer electrolyte membrane having a pair of electrode catalysts disposed on opposing surfaces. The fuel cell further includes a pair of collectors, each having a rigid body, and in contact with respective electrode catalysts. Each of the separators comprises a pair of pressure generating plates defining therebetween a pressure chamber, to which pressurized fluid is introduced. The pressure generating plates are deformable by the pressurized fluid, and are pressed against adjacent collectors.

Other prior art fuel cell stacks use pressure relief valves that include a housing having a passageway extending therethrough and include an inlet, an outlet, and a membrane extending across the passageway between the inlet and the outlet. The membrane permits the passage of gas at a first pressure, inhibits the passage of fluid at a first pressure, and permits the passage of liquid at a second pressure greater that the first pressure. The pressure relief valves may also include a check valve for inhibiting the passage of gas from the outlet to the inlet. The pressure relief valves are suitably employed in fuel cell systems such as in cooling systems for fuel cells. The pressure relief valves may be used in cooling systems to release gases or liquids therefrom in an overpressure condition.

It would be desirable to produce a fuel cell stack assembly having an integrated pressure relief valve to militate against an over pressurization of the stack assembly.

SUMMARY OF THE INVENTION

Harmonious with the present invention, a fuel cell stack assembly having an integrated pressure relief valve to militate against an over pressurization of the stack assembly, has surprisingly been discovered.

In one embodiment, a pressure relief valve assembly for a fuel cell stack comprises a valve housing adapted to be received in the fuel cell stack; and a valve body cooperating with the valve housing to provide selective venting of fluid from at least one of an anode side, a cathode side, and a coolant system of the fuel cell stack to militate against an over pressurization thereof.

In another embodiment, a pressure relief valve assembly for a fuel cell stack comprises a valve housing adapted to be received in the fuel cell stack; a valve body cooperating with the valve housing to provide selective venting of fluid from at least one of an anode side, a cathode side, and a coolant system of the fuel cell stack to militate against an over pressurization thereof; a seal abutting the valve body to militate against venting of fluid under normal operating pressures of the fuel cell stack; and a valve biasing means for urging the valve body into a seated position to militate against venting of fluid under normal operating pressures of the fuel cell stack.

In another embodiment, a fuel cell stack comprises a fuel source in communication with an anode; an oxidant source in communication with a cathode; and a pressure relief assembly including a valve housing adapted to be received in the fuel cell stack and a valve body cooperating with the valve housing to provide selective venting of fluid from at least one of an anode side, a cathode side, and a coolant system of the fuel cell stack to militate against an over pressurization thereof.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
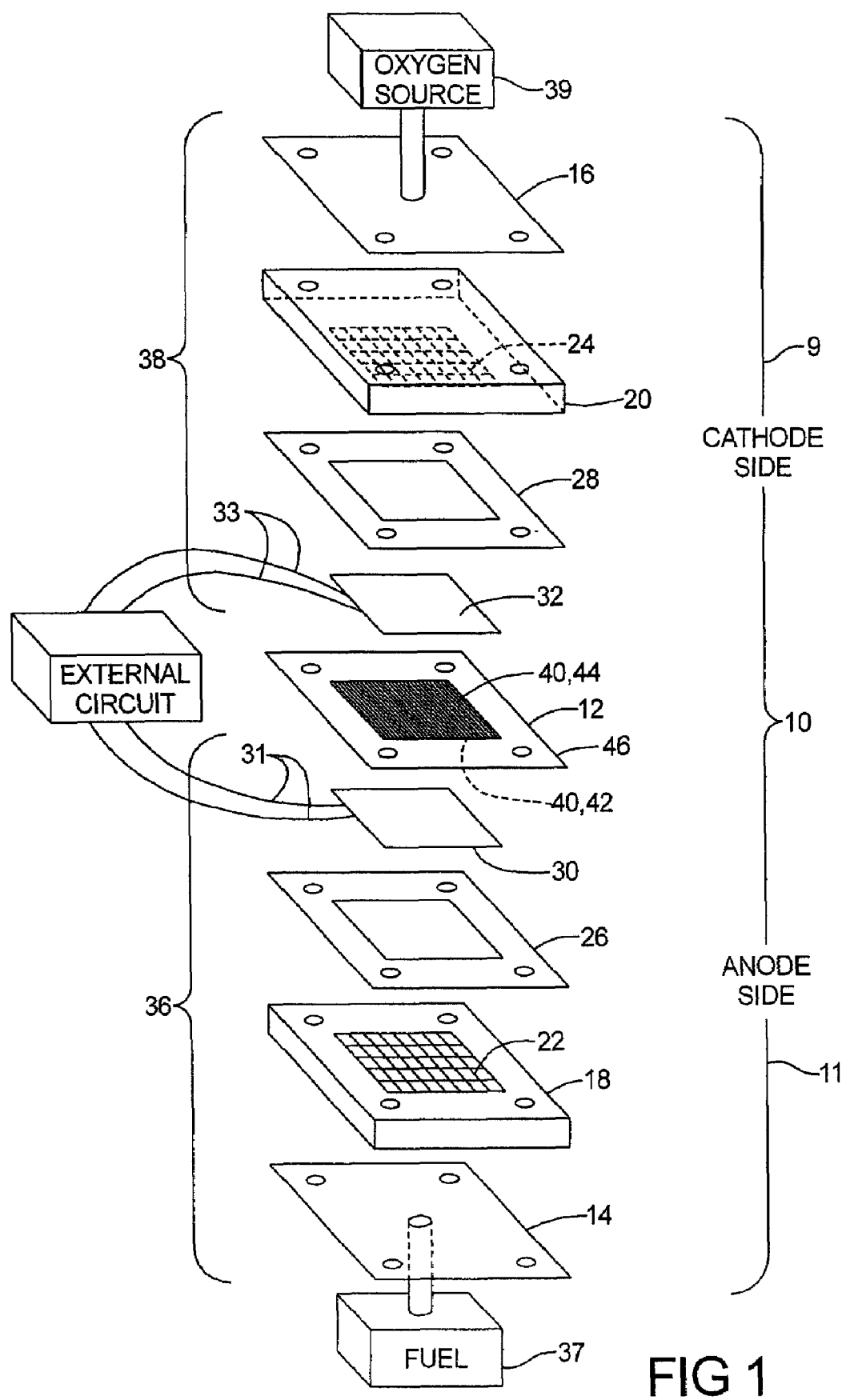
FIG. 1 is an exploded perspective view of a fuel cell system.

FIG. 1 shows a fuel cell 10 having a cathode side 9 and an anode side 11. The anode side 11, the cathode side 9, and a coolant system (not shown) are collectively referred to as a wet end of the fuel cell 10. The insulation end plates 14, 16 are referred to as a dry end of the fuel cell 10. The fuel cell 10 includes a fuel source 37, an oxidant source 39, the insulation end plates 14, 16, graphite blocks 18, 20 having a plurality of openings 22, 24 to facilitate fluid distribution, gaskets 26, 28, carbon cloth current collectors 30, 32 having respective connections 31, 33, and a membrane electrolyte and electrode assembly (MEA) 12. An oxidant and current transport means 36 is made up of the graphite block 18, the gasket 26, and the current collector 30. A fuel and current transport means 38 is made up of the graphite block 20, the gasket 28, and the current collector 32. The anode connection 31 and the cathode connection 33 are used to interconnect the fuel cell 10 with an external circuit, and may include other fuel cells (not shown) as desired.

A fuel cell stack (not shown) is constructed of a plurality of fuel cells 10 paired together. Once a desired number of fuel cell 10 pairs are joined together to form a stack, the stack is provided with a coolant system and finished with insulation end plates 14, 16. A fuel cell stack as described herein is commonly used as a power plant for the generation of electric power such as a vehicle, for example.

In use, the fuel such as hydrogen is supplied from the fuel source 37 and the oxidant such as oxygen, for example, is supplied from the oxidant source 39. The fuel and oxidant from respective sources 37, 39 diffuse through respective fluid and current transport means 36, 38 to opposing sides of the MEA 12. Porous electrodes 40 form an anode 42 at the anode side 11 and a cathode 44 at the cathode side 9, and are separated by a Proton Exchange Membrane (PEM) 46. The PEM 46 provides for ion transport to facilitate a chemical reaction in the fuel cell 10. Typically, PEM 46 is produced from copolymers of suitable monomers. Such proton exchange membranes may be characterized by monomers of the structures:

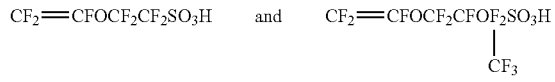

Such a monomer structure is disclosed in detail in U.S. Pat. No. 5,316,871 to Swarthirajan et al, incorporated herein by reference in its entirety.

Figure 2:
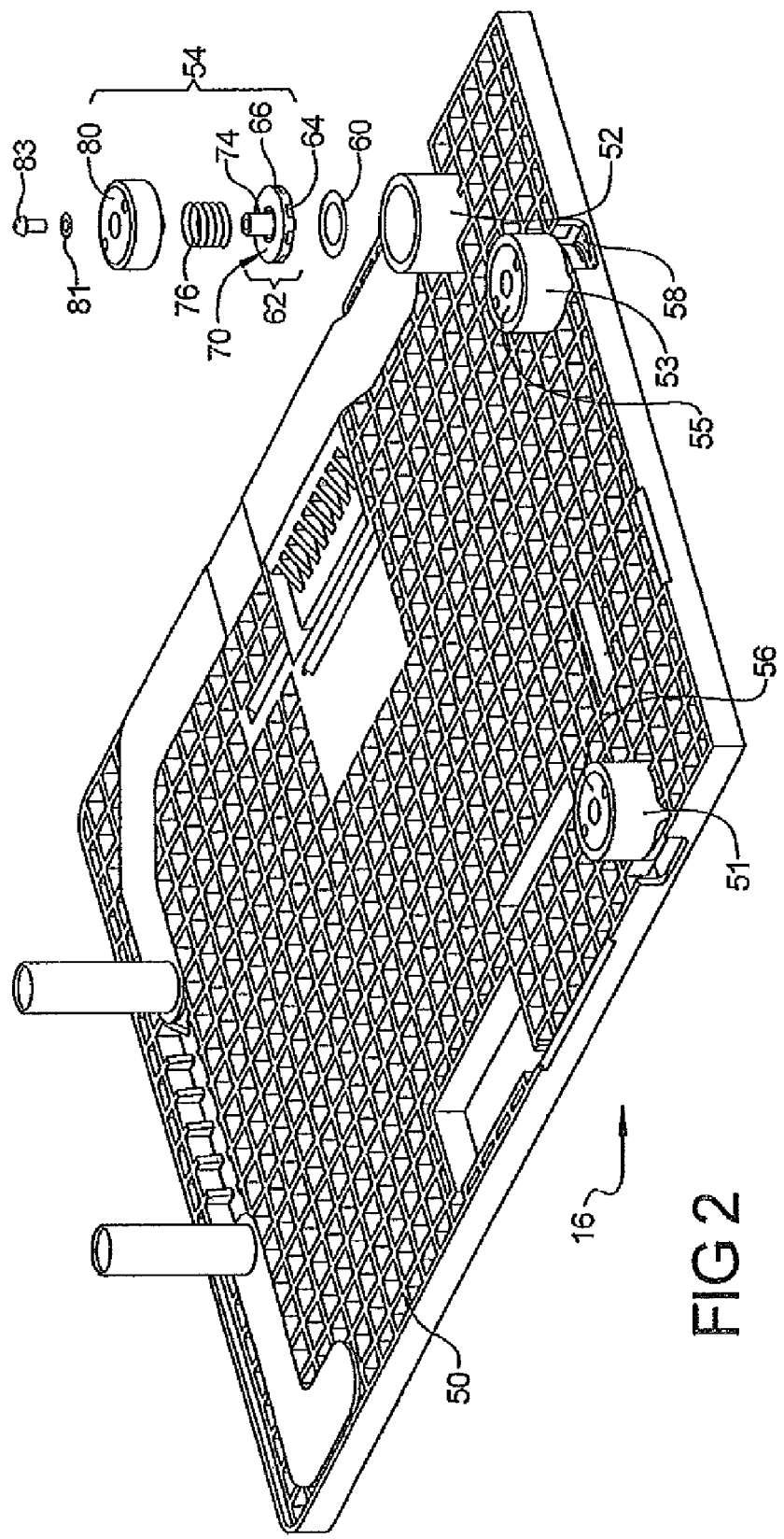
FIG. 2 is an exploded perspective view of a pressure relief valve assembly and an insulation end plate for a fuel cell system, the end plate having integrated hollow members.
Figure 3:
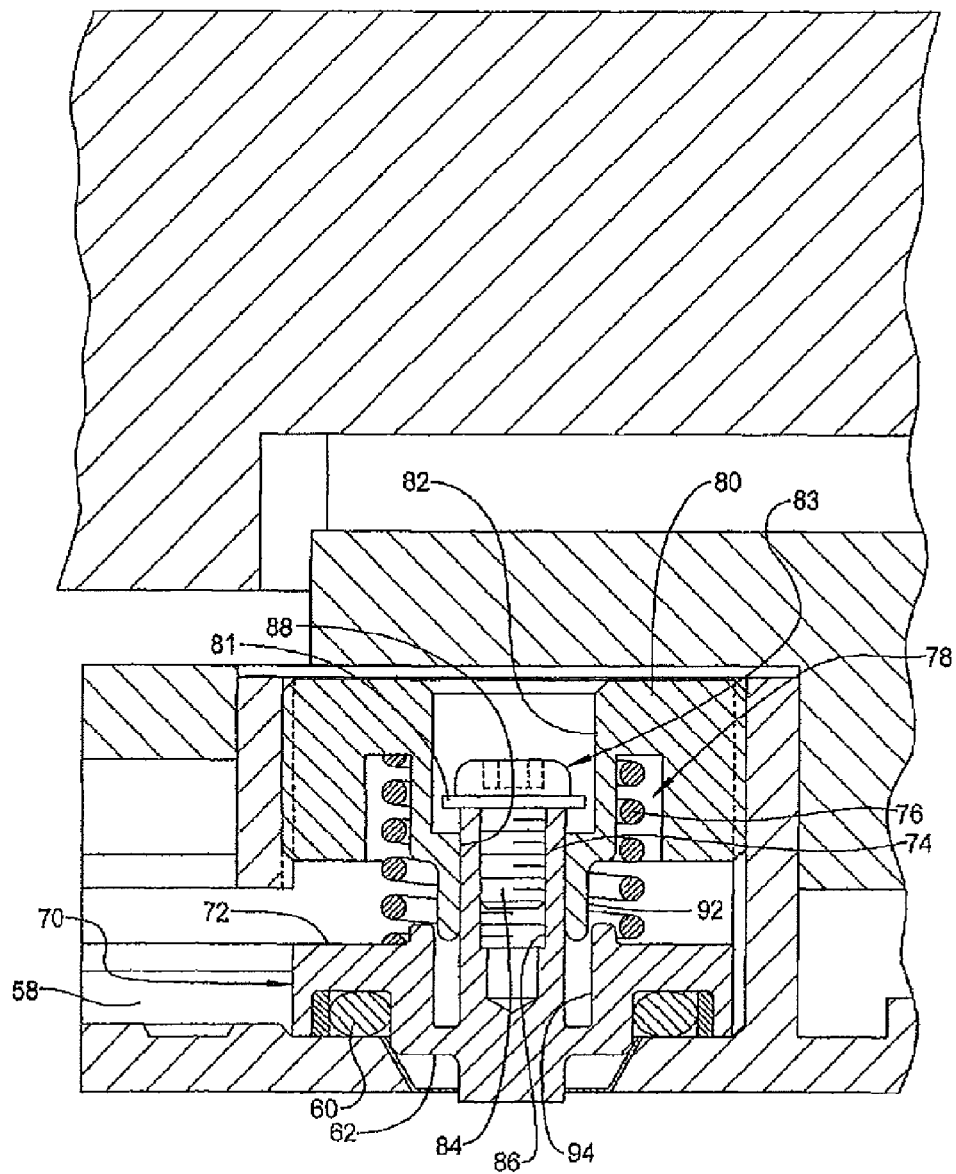
FIG. 3 is a cross sectional view of the pressure relief valve assembly illustrated in FIG. 2, shown within a pressure passageway of a fuel cell stack.

FIGS. 2 and 3 depict the insulation end plate 16 shown in FIG. 1, and include an integrated pressure relief valve assembly 54. The structure of the insulation end plate 16 as seen in FIG. 2 is disclosed in commonly owned U.S. patent application Ser. No. 11/397,753 filed Apr. 4, 2006, hereby incorporated by reference in its entirety. The insulation end plate 16 includes a plurality of vanes 50 to provide increased surface area to assist in temperature control of the fuel cell stack during operation.

In the embodiment shown, the insulation end plate 16 includes a plurality of hollow members 51, 52, 53 formed therein. It is understood that more or fewer hollow members 51, 52, 52 can be provided as desired. The hollow member 51 is in fluid communication with the cathode side 9 of the fuel cell 10, the hollow member 52 is in fluid communication with the anode side 11 of the fuel cell 10, and the hollow member 53 is in fluid communication with the coolant system of the fuel cell 10. In the embodiment shown, the hollow members 51, 52, 53 are all disposed at one end of the insulation end plate 16. The hollow members 51, 52, 53 are adapted to receive pressure relief valve assemblies 54, 55, 56 therein. The insulation end plate 14 typically includes the same structural components as insulation end plate 16.

As shown in FIGS. 2 and 3, the pressure relief valve assembly 54 includes a seal 60, a valve body 62, a valve biasing means 76, a valve housing 80, a washer 81, and a threaded fastener 83. In the embodiment shown, the seal 60 is an O-ring. However, other seal types may be used without departing from the spirit or scope of the invention.

The valve body 62 includes a valve head 70 and a valve stem 74. The valve head 70 extends from a seat face to a back face 72, and includes a plurality of channels 64 extending radially outwardly to a peripheral edge 66 thereof.

The valve biasing means 76 shown in FIG. 2 is a coil spring. However, other conventional biasing means can be used as desired. The valve biasing means 76 is sized according to the pressure considerations of the fuel cell stack to permit the pressure relief valve assembly 54 to open and relieve pressure when a predetermined pressure of the fuel cell stack is reached.

As more clearly shown in FIG. 3, the valve biasing means 76 is seated at one end against the back face 72 of the valve assembly 54 and at an opposite end into a hollow member 78 formed in a valve housing 80. The valve housing 80 has an aperture 82 formed therein adapted to receive a washer 81 and the threaded fastener 83. The threaded fastener 83 has a threaded portion 84 that is received in a threaded aperture 86 formed in the valve stem 74. The valve stem 74 is slidably positionable in an aperture 88 formed in a housing stem 92 of the valve housing 80. A recess 94 is formed in the valve body 62 to permit the housing stem 92 to move between an open and a closed position.

The pressure relief valve assemblies 55, 56 can include the same structural components as the pressure relief valve assembly 54.

In use, the fuel cell stack generates heat and the internal cooling system circulates coolant to cool the stack. The vanes 50 on the insulation end plate 16 assist in a temperature regulation of the fuel cell stack.

Each hollow member 51, 52, 53 is in fluid communication with a fluid passage of the fuel cell stack to accommodate venting for fluid in the event there is an over pressurization of the fuel cell stack. Such over pressurization may develop during stacking, filling, or leak testing of the fuel cell stack. Unless these fluids are vented, holes may form in the fuel cell assemblies resulting in undesirable leaks that may affect the efficiency of the fuel cell assembly operation.

The seal 60 militates against the passage of fluid during normal pressure conditions in the fuel cell stack. The channels 64 formed in the valve head 70 permit fluids to enter the valve body 62 and permit venting of the fluids during over pressurization.

The valve biasing means 76 urge the valve body 62 into a seated sealed position during operation under normal pressures in the fuel cell stack. When the pressurized fluid reaches an over pressurized condition in the fuel cell stack, a force exerted by the fluid on the valve body 62 causes the valve body 62 to be urged against the bias created by the valve biasing means 76. This unseats the valve body 62 from the seal 60, and allows the pressurized fluid to vent through the channels 64 and thereafter through an exhaust port 58 in the insulation end plate 16. Once sufficient venting has occurred, the force created the pressurization becomes less that the force exerted by the valve biasing means 76 and the force exerted by the valve biasing means 76 causes the valve body 62 to re-seat.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An insulation end plate for a fuel cell stack having a plurality of fuel cells, the insulation end plate comprising:
   a plate having a plurality of hollow members formed therein, the hollow members including substantially cylindrical tubes extending outwardly from the plate, the plurality of hollow members including a first hollow member, a second hollow member, and a third hollow member, the first hollow member in fluid communication with a cathode side of the fuel cells, the second hollow member in fluid communication with an anode side of the fuel cells, and the third hollow member in fluid communication with a coolant system of the fuel cells; and
   a pressure relief valve assembly disposed in each of the hollow members, the pressure relief valve assembly including a seal, a valve housing, and a valve body, a valve biasing means, and a threaded fastener, the valve body including a valve head extending from a seat surface to a back face and including a plurality of channels extending radially outwardly to a peripheral edge of the valve head, and a valve stem extending outwardly from the back face of the valve head, the seat surface having an annular groove formed therein, the seal disposed in the annular groove and abutting the plate and the valve head when the valve head is in a closed position, the valve biasing means disposed over the valve stem and between the back face of the valve head and the valve housing, the valve biasing means biasing the valve head away from the valve housing, the valve housing having an aperture within which the threaded fastener is disposed, the threaded fastener cooperating with a threaded aperture formed in the valve stem, the valve head permitted to move between an open position and a closed position relative to the valve housing when the pressurization within the fuel cell stack occurs that is sufficient to move the valve head against the biasing of the valve biasing means,
   wherein the pressure relief valve assembly provides a provide selective venting of a fluid from each of the anode side, the cathode side, and the coolant system of the fuel cell stack to militate against an over pressurization of the fuel cell stack.

2. The insulation end plate according to claim 1 wherein the valve biasing means is a spring.

3. The insulation end plate according to claim 1, wherein the valve housing includes an outwardly projecting housing stem that is disposed over the valve stem of the valve body.

4. The insulation end plate according to claim 3, wherein the valve biasing means is also disposed over the housing stem.

5. The insulation end plate according to claim 4, wherein the valve head has an annular recess formed in the back face of the valve head, the annular recess circumscribing the valve stem and cooperating with the housing stem to guide the valve head when the valve head moves between the open position and the closed position.

6. The insulation end plate according to claim 5, further comprising a plurality of exhaust ports formed in the plate, at least one of the exhaust ports disposed adjacent the valve head of one of the pressure relief valve assemblies and in selective fluid communication with one of the cathode side, the anode side, and the coolant system of the fuel cell stack, the at least one of the exhaust ports permitting the fluid to vent therethrough when the adjacent valve head of the pressure relief valve assembly is unseated by over pressurization and in placed in the open position.

7. A fuel cell stack having a plurality of fuel cells, each of the fuel cells having a cathode side, an anode side, and a coolant system, the fuel cell stack comprising:
   a fuel source in communication with the anode sides of the fuel cells;
   an oxidant source in communication with the cathode sides of the fuel cells;
   a coolant source in communication with the coolant system; and
   a pair of insulation end plates having the fuel cells interposed therebetween, one of the insulation end plates comprising a plate having a plurality of hollow members formed therein, the hollow members including substantially cylindrical tubes extending outwardly from the plate, the plurality of hollow members including a first hollow member, a second hollow member, and a third hollow member, the first hollow member in fluid communication with a cathode side of the fuel cell stack, the second hollow member in fluid communication with an anode side of the fuel cell stack, and the third hollow member in fluid communication with a coolant system of the fuel cell stack, and a pressure relief valve assembly disposed in each of the hollow members, the pressure relief valve assembly including a seal, a valve housing a valve body, a valve biasing means, and a threaded fastener, the valve body including a valve head extending from a seat surface to a back face and including a plurality of channels extending radially outwardly to a peripheral edge of the valve head, and a valve stem extending outwardly from the back face of the valve head, the seat surface having an annular groove formed therein, the seal disposed in the annular groove and abutting the plate and the valve head when the valve head is in a closed position, the valve biasing means disposed over the valve stem and between the back face of the valve head and the valve housing, the valve biasing means biasing the valve head away from the valve housing, the valve housing having an aperture within which the threaded fastener is disposed, the threaded fastener cooperating with a threaded aperture formed in the valve stem, the valve head permitted to move between an open position and the closed position relative to the valve housing when a pressurization within the fuel cell stack occurs that is sufficient to move the valve head against the biasing of the valve biasing means, wherein the pressure relief valve assembly provides a selective venting of a fluid from each of the anode side, the cathode side, and the coolant system of the fuel cell stack to militate against an over pressurization of the fuel cell stack.

8. The fuel cell stack according to claim 7 wherein the biasing means is a spring.

* * * * *